(12) United States Patent
Sakaguchi

(10) Patent No.: US 11,316,464 B2
(45) Date of Patent: Apr. 26, 2022

(54) SHIFT RANGE CONTROL DEVICE

(71) Applicant: DENSO CORPORATION, Kariya (JP)

(72) Inventor: Koji Sakaguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/188,290

(22) Filed: Mar. 1, 2021

(65) Prior Publication Data

US 2021/0184613 A1    Jun. 17, 2021

Related U.S. Application Data

(63) Continuation of application No. PCT/JP2019/034083, filed on Aug. 30, 2019.

(30) Foreign Application Priority Data

Sep. 3, 2018 (JP) .............................. JP2018-164215

(51) Int. Cl.
| | |
|---|---|
| *B60L 15/20* | (2006.01) |
| *H02P 25/22* | (2006.01) |
| *F16H 59/70* | (2006.01) |
| *F16H 61/12* | (2010.01) |
| *F16H 61/32* | (2006.01) |
| *H02P 6/16* | (2016.01) |
| *H02P 6/22* | (2006.01) |
| *H02P 23/14* | (2006.01) |
| *H02P 27/06* | (2006.01) |
| *H02P 29/028* | (2016.01) |

(52) U.S. Cl.
CPC ............. *H02P 25/22* (2013.01); *F16H 59/70* (2013.01); *F16H 61/12* (2013.01); *F16H 61/32* (2013.01); *H02P 6/16* (2013.01); *H02P 6/22* (2013.01); *H02P 23/14* (2013.01); *H02P 27/06* (2013.01); *H02P 29/028* (2013.01)

(58) Field of Classification Search
CPC .. B60L 15/20; H02P 25/22; H02P 6/16; H02P 6/22; H02P 23/14; H02P 27/06; H02P 29/028; F16H 59/70; F16H 61/12; F16H 61/32
See application file for complete search history.

(56) References Cited

U.S. PATENT DOCUMENTS

| | | | |
|---|---|---|---|
| 2013/0144478 A1* | 6/2013 | Suzuki ................... | B60L 15/20 701/22 |
| 2019/0195354 A1 | 6/2019 | Kamio | |

FOREIGN PATENT DOCUMENTS

JP    2019/094943    6/2019

* cited by examiner

*Primary Examiner* — Cortez M Cook
(74) *Attorney, Agent, or Firm* — Nixon & Vanderhye P.C.

(57) ABSTRACT

A shift range control device includes a plurality of control units provided for each of motor windings. When a motor rotation angle sensor is normal, a drive control unit controls an energization of the motor winding of its own system by using a motor rotation angle signal. When the motor rotation angle sensor has an abnormality and it is determined that an output shaft is rotating before a standby time elapses, the drive control unit does not energize the motor winding of its own system. When it is determined that the output shaft is not rotating even after the standby time has elapsed, the drive control unit controls the energization of the motor winding of its own system without using the motor rotation angle signal.

5 Claims, 13 Drawing Sheets

SHIFT RANGE CONTROL DEVICE

CROSS REFERENCE TO RELATED APPLICATIONS

This application is a continuation application of International Patent Application No. PCT/JP2019/034083 filed on Aug. 30, 2019, which designated the U.S. and based on and claims the benefits of priority of Japanese Patent Application No. 2018-164215 filed on Sep. 3, 2018. The entire disclosure of all of the above applications is incorporated herein by reference.

TECHNICAL FIELD

The present disclosure relates to a shift range control device.

BACKGROUND

A shift range control device for switching a shift range by controlling drive of a motor has been known.

SUMMARY

An object of the present disclosure is to provide a shift range control device capable of appropriately switching the shift range.

A shift range control device of the present disclosure includes a plurality of control units provided for each of motor windings, and switches a shift range by controlling the drive of the motor in a shift range switching system including a motor and an output shaft. The motor has a plurality of sets of motor windings, and the motor shaft rotates by energizing the motor windings. The rotation of the motor shaft is transmitted to the output shaft.

Each control unit includes a motor rotation angle signal acquisition unit, an output shaft signal acquisition unit, a drive control unit, and an abnormality determination unit. The motor rotation angle signal acquisition unit acquires a motor rotation angle signal from a motor rotation angle sensor that detects a rotation position of the motor. The output shaft signal acquisition unit acquires an output shaft signal from an output shaft sensor that detects a rotation position of the output shaft. The drive control unit controls energization of the motor winding. The abnormality determination unit determines an abnormality in the motor rotation angle sensor. A combination of the motor winding and the control unit corresponding to the motor winding is referred to as a system. When motor rotation angle sensors are normal, drive control unit controls the energization of the motor winding of its own system by using a motor rotation angle signal.

BRIEF DESCRIPTION OF DRAWINGS

The above and other objects, features and advantages of the present disclosure will become more apparent from the following detailed description made with reference to the accompanying drawings. In the drawings.

DETAILED DESCRIPTION

Figure 1:
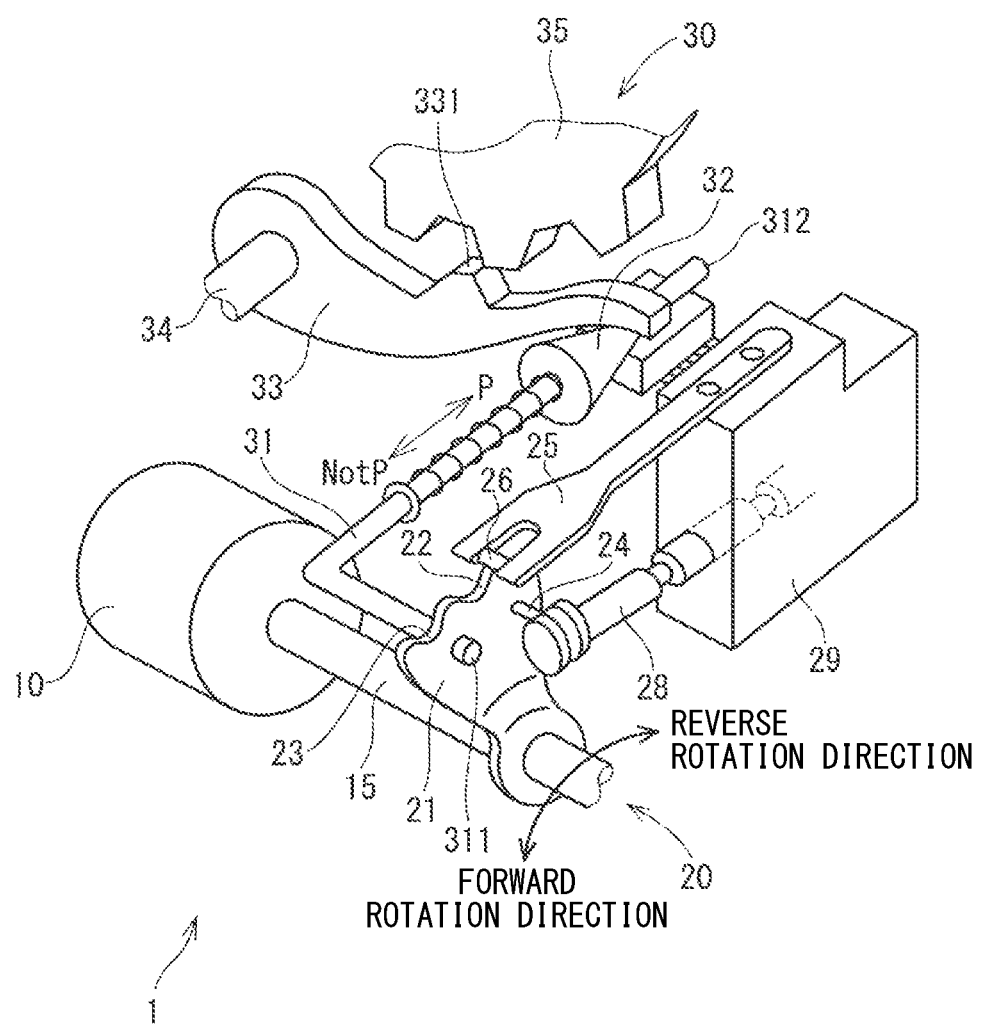
FIG. 1 is a perspective view showing a shift-by-wire system according to a first embodiment.

In an assumable example, a shift range control device for switching a shift range by controlling drive of a motor has been known. For example, when the drive of the motor is controlled by one of two computers and an abnormality occurs in the computer used for the drive control of the motor, the computer used for the drive control of the motor is switched to another computer.

By the way, in the case of complete independence in which communication between a plurality of control units is not performed, or when an abnormality occurs in communication between the control units, there is a possibility that the control unit used for switching control of shift range cannot be properly selected. An object of the present disclosure is to provide a shift range control device capable of appropriately switching the shift range.

A shift range control device of the present disclosure includes a plurality of control units provided for each of motor windings, and switches a shift range by controlling the drive of the motor in a shift range switching system including a motor and an output shaft. The motor has a plurality of sets of motor windings, and the motor shaft rotates by energizing the motor windings. The rotation of the motor shaft is transmitted to the output shaft.

Each control unit includes a motor rotation angle signal acquisition unit, an output shaft signal acquisition unit, a drive control unit, and an abnormality determination unit. The motor rotation angle signal acquisition unit acquires a motor rotation angle signal from a motor rotation angle sensor that detects a rotation position of the motor. The output shaft signal acquisition unit acquires an output shaft signal from an output shaft sensor that detects a rotation position of the output shaft. The drive control unit controls energization of the motor winding. The abnormality determination unit determines an abnormality in the motor rotation angle sensor. A combination of the motor winding and the control unit corresponding to the motor winding is referred to as a system. When motor rotation angle sensors are normal, drive control unit controls the energization of the motor winding of its own system by using a motor rotation angle signal.

When the motor rotation angle sensor has an abnormality and it is determined that the output shaft is rotating before the standby time elapses, the drive control unit does not energize the motor winding of its own system. Further, when the motor rotation angle sensor has an abnormality and it is determined that the output shaft is rotating before the standby time elapses, the drive control unit does not energize the motor winding of its own system without using the motor rotation angle signal. As a result, even if an abnormality occurs in the motor rotation angle sensor, the shift range can be appropriately switched.

A shift range control device will be hereinafter described with reference to the drawings. Hereinafter, in a plurality of embodiments, a substantially equivalent configuration will be denoted by an identical reference, and explanation thereof will be omitted.

First Embodiment

Figure 2:
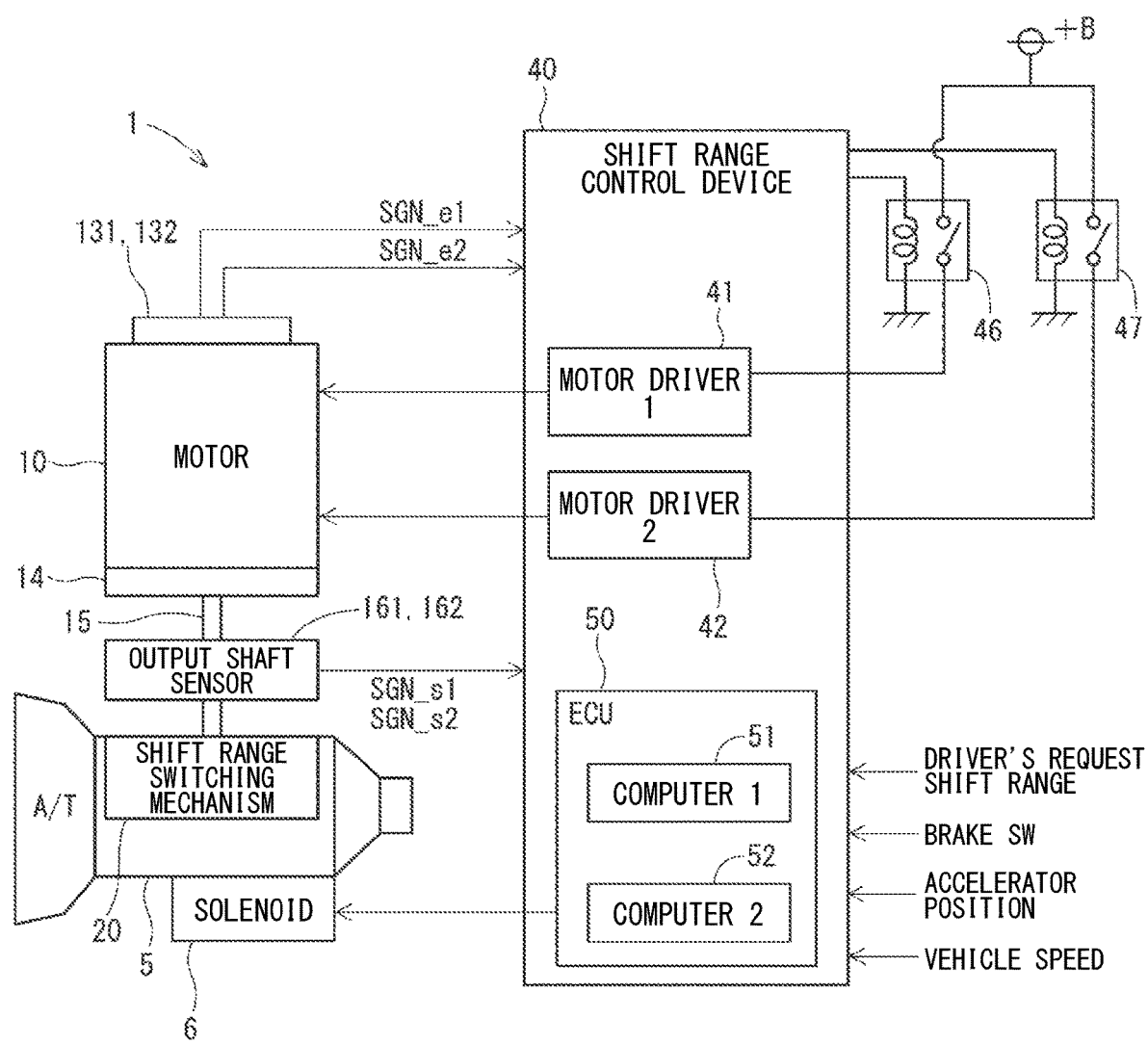
FIG. 2 is a schematic configuration diagram showing a shift-by-wire system according to the first embodiment.

The first embodiment is shown in FIGS. 1 to 11. As shown in FIGS. 1 and 2, a shift-by-wire system 1 as a shift range switching system includes a motor 10, a shift range switching mechanism 20, a parking lock mechanism 30, a shift range control device 40, and the like.

The motor 10 rotates while receiving an electric power from a battery 45 mounted on a vehicle (not shown), and functions as a driving source of the shift range switching mechanism 20. The motor 10 of the present embodiment is a permanent magnet type DC brushless motor.

Figure 3:
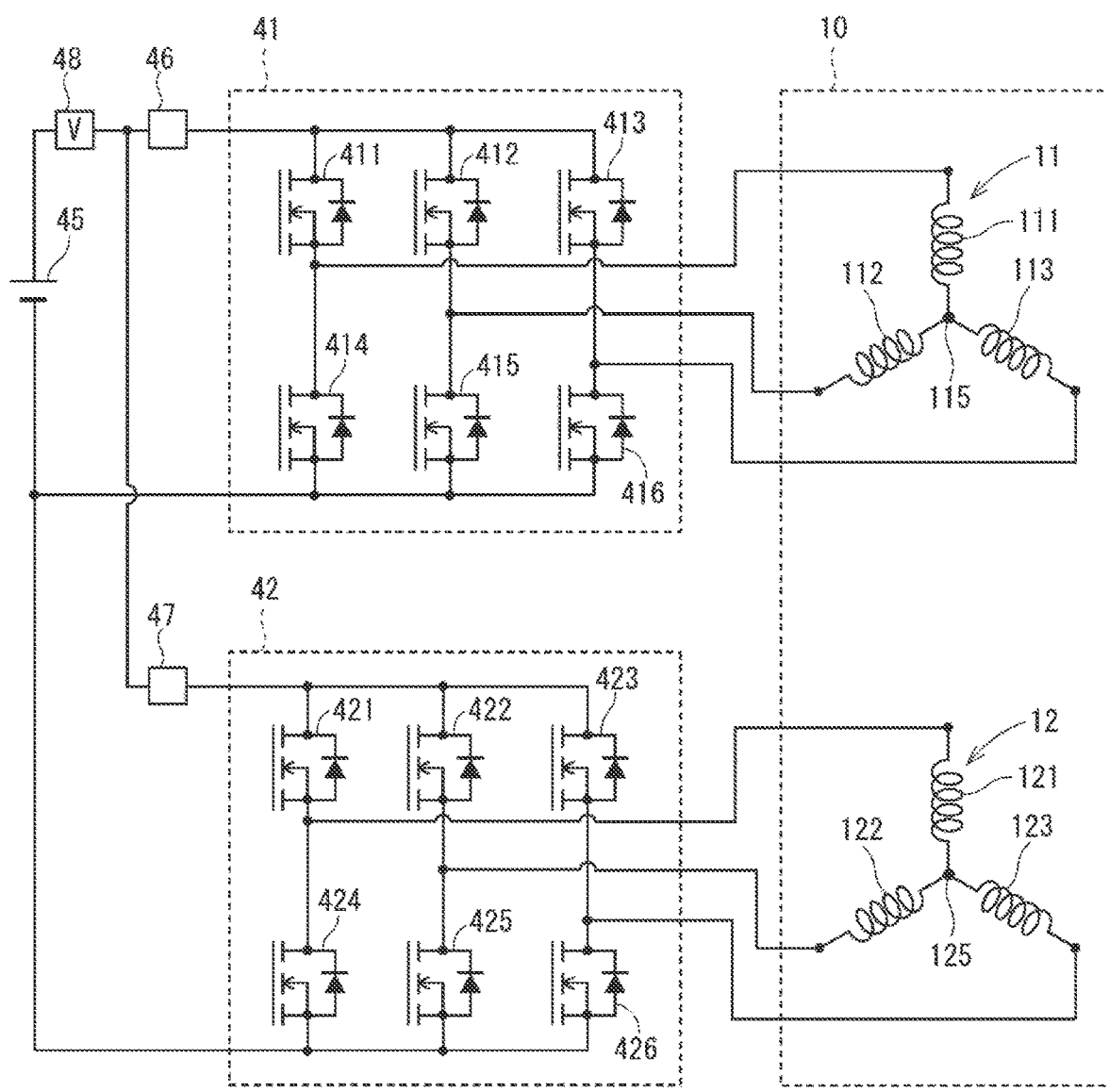
FIG. 3 is a circuit diagram showing a motor and a motor driver according to the first embodiment.

As shown in FIG. 3, the motor 10 has two sets of motor windings 11 and 12 wound around a stator (not shown). The first motor winding 11 includes a U1 coil 111, a V1 coil 112, and a W1 coil 113. The second motor winding 12 includes a U2 coil 121, a V2 coil 122, and a W2 coil 123.

As shown in FIG. 2, the encoders 131 and 132 as the motor rotation angle sensor detect a rotation position of a rotor (not shown). The encoders 131 and 132 are, for example, magnetic rotary encoders, and each include a magnet rotating integrally with a rotor, a Hall IC for magnetic detection, and the like. Each of the encoders 131 and 132 is a three-phase encoder that outputs an encoder signal which is A phase, B phase, and C phase pulse signal at predetermined angles in synchronization with the rotation of the rotor.

A speed reducer 14 is provided between a motor shaft of the motor 10 and an output shaft 15 and outputs the rotation of the motor 10 to the output shaft 15 after speed reduction. The rotation of the motor 10 is thus transmitted to the shift range switching mechanism 20. The output shaft sensors 161 and 162 for detecting an angle of the output shaft 15 are provided on the output shaft 15. Each of the output shaft sensors 161 and 162 of the present embodiment is, for example, a potentiometer.

As shown in FIG. 1, the shift range switching mechanism 20 includes a detent plate 21, a detent spring 25 and the like. The shift range switching mechanism 20 transmits the rotational drive force output from the speed reducer 14 to a manual valve 28 and a parking lock mechanism 30.

The detent plate 21 is fixed to the output shaft 15 and driven by the motor 10. In the present embodiment, a direction in which the detent plate 21 is separated from the base of the detent spring 25 is defined as a forward rotation direction, and a direction in which the detent plate 21 approaches the base is defined as a reverse rotation direction.

The detent plate 21 has a pin 24 protruding in parallel with the output shaft 15. The pin 24 is connected to a manual valve 28. The detent plate 21 is driven by the motor 10, whereby the manual valve 28 reciprocates in an axial direction. That is, the shift range switching mechanism 20 converts the rotational motion of the motor 10 into a linear motion and transmits the linear motion to the manual valve 28. The manual valve 28 is provided on a valve body 29. When the manual valve 28 moves back and forth in the axial direction to switch hydraulic pressure supply paths, which are lead to a hydraulic clutch (not shown), thereby to switch an engagement state of the hydraulic clutch. In this way, the shift range is switched.

Two recesses 22 and 23 are provided in the detent plate 21 on the detent spring 25 side. In the present embodiment, the side closer to the base of the detent spring 25 is the recess 22 and the side farther therefrom is the recess 23. In the present embodiment, the recess 22 corresponds to a not-P (NotP) range except for a P range, and the recess 23 corresponds to the P range.

The detent spring 25 is an elastically deformable plate-like member, and is provided with a detent roller 26 at a tip of the detent spring 25. The detent spring 25 biases the detent roller 26 toward a rotation center of the detent plate 21. When a rotational force equal to or greater than a predetermined force is applied to the detent plate 21, the detent spring 25 is elastically deformed, and the detent roller 26 moves between the recesses 22 and 23. When the detent roller 26 is fitted to any of the recesses 22 and 23, swing of the detent plate 21 is regulated. Accordingly, an axial position of the manual valve 28 and the state of the parking lock mechanism 30 are determined to fix the shift range of an automatic transmission 5. The detent roller 26 fits into the recess 22 when the shift range is the NotP range, and fits into the recess 23 when the shift range is the P range.

The parking lock mechanism 30 includes a parking rod 31, a conical member 32, a parking lock pawl 33, a shaft part 34 and a parking gear 35. The parking rod 31 is formed in a substantially L-shape. The parking rod 31 is fixed to the detent plate 21 on the side of one end 311. The conical member 32 is provided to the other end 312 of the parking rod 31. The conical member 32 is formed to reduce in diameter toward the other end 312. When the detent plate 21 pivots in the reverse rotation direction, the conical member 32 moves in a P direction.

The parking lock pawl 33 is configured to abut on a conical surface of the conical member 32 and to pivot around the shaft part 34, and the parking lock pawl 33 has a protrusion 331 on the side of the parking gear 35. The protrusion 331 is configured to mesh with the parking gear 35. When the detent plate 21 rotates in the reverse rotation direction and the conical member 32 moves in the direction of arrow P, the parking lock pawl 33 is pushed up, and the protrusion 331 meshes with the parking gear 35. On the other hand, when the detent plate 21 rotates in the forward rotational direction and the conical member 32 moves in a direction of an arrow non-P, the engagement between the protrusion 331 and the parking gear 35 is released.

The parking gear 35 is provided on an axle (not shown) and is enabled to mesh with the protrusion 331 of the parking lock pawl 33. When the parking gear 35 meshes with the protrusion 331, rotation of the axle is restricted. When the shift range is the NotP range, the parking gear 35 is not locked by the parking lock pawl 33 and the rotation of the axle is not restricted by the parking lock mechanism 30.

When the shift range is the P range, the parking gear 35 is locked by the parking lock pawl 33 and the rotation of the axle is restricted.

Figure 4:
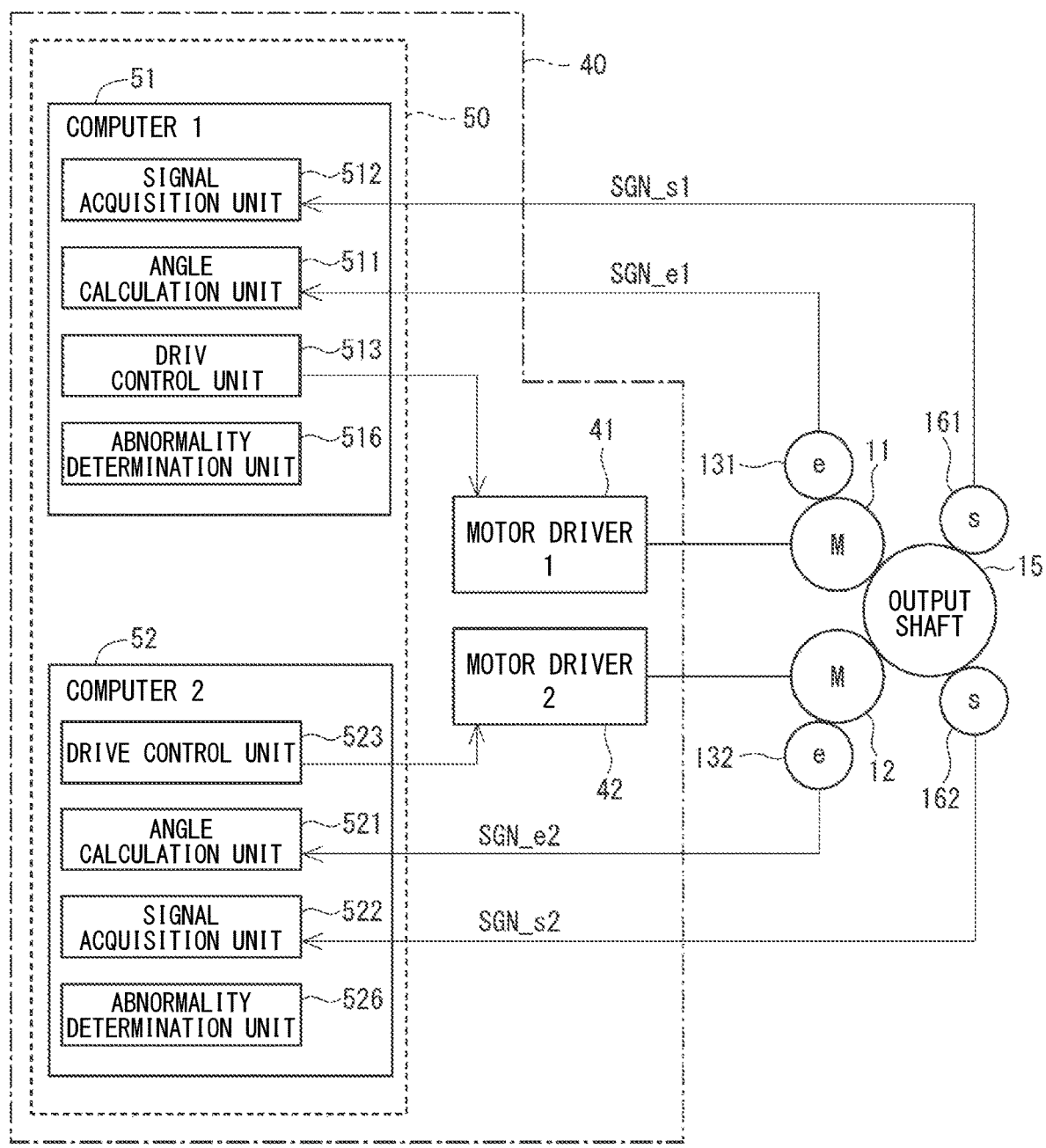
FIG. 4 is a block diagram showing a shift range control device according to the first embodiment.

As shown in FIGS. 2 to 4, the shift range control device 40 includes motor drivers 41 and 42, computers 51 and 52 as control units, and the like. As shown in FIG. 3, the first motor driver 41 is a three-phase inverter for switching the energization of the first motor winding 11, and the switching elements 411 to 416 are bridge-connected to each other. The switching elements 411 and 414 are paired and belong to U-phase. The switching elements 411 and 414 have a connection point therebetween, and the connection point is connected with one end of an U1 coil 111. The switching elements 412 and 415 are paired and belong to V-phase. The switching elements 412 and 415 have a connection point therebetween, and the connection point is connected with one end of a V1 coil 112. The switching elements 413 and 416 are paired and belong to W-phase. The switching elements 413 and 416 have a connection point therebetween, and the connection point is connected with one end of a W1 coil 113. The other ends of the coils 111 to 113 are connected to each other at a connected portion 115.

The second motor driver 42 is a three-phase inverter for switching the energization of the second motor winding 12, and the switching elements 421 to 426 are bridge-connected to each other. The switching elements 421 and 424 are paired and belong to U-phase. The switching elements 421 and 424 have a connection point therebetween, and the connection point is connected with one end of the U2 coil 121. The switching elements 422 and 425 are paired and belong to V-phase. The switching elements 422 and 425 have a connection point therebetween, and the connection point is connected with one end of the V2 coil 122. The switching elements 423 and 426 are paired and belong to W-phase. The switching elements 423 and 426 have a connection point therebetween, and the connection point is connected with one end of the W2 coil 123. The other ends of the coils 121 to 123 are connected at a connection portion 125. While the switching elements 411 to 416 and 421 to 426 according to the present embodiment are MOSFETs, other devices such as IGBTs may also be employed.

As shown in FIGS. 2 and 3, a motor relay 46 is provided between the motor driver 41 and the battery 45. A motor relay 47 is provided between the motor driver 42 and the battery 45. When a starter switch, such as an ignition switch or the like, is turned on, the motor relays 46 and 47 are energized to supply electric power to the motor 10. When the starter switch is turned off, the motor relays 46 and 47 are deenergized to shut off electric power supply to the motor 10. A voltage sensor 48 for detecting the battery voltage V is provided on a high potential side of the battery 45.

The ECU 50 controls the on/off operation of the switching elements 411 to 416 and 421 to 426, and controls the drive of the motor 10 to control the switching of the shift range. The ECU 50 performs a control to drive a transmission hydraulic control solenoid 6 based on a vehicle speed, an accelerator position, a shift range requested by a driver, and the like. The transmission hydraulic control solenoid 6 is controlled to manipulate a shift stage. The number of the transmission hydraulic control solenoids 6 is determined according to the shift stage or the like. According to the present embodiment, a singular ECU 50 performs the control to drive the motor 10 and the solenoid 6. It is noted that, the ECU may be divided into a motor ECU, which is for motor control to control the motor 10, and an AT-ECU, which is for solenoid control. Hereinafter, a drive control of the motor 10 will be mainly described.

The ECU 50 includes computers 51 and 52, and the like, and internally includes a CPU (not shown), a ROM, a RAM, an I/O, a bus line for connecting those components, and the like. Each process executed by the ECU 50 may be software processing or may be hardware processing. The software processing may be implemented by causing a CPU to execute a program. The program may be stored beforehand in a material memory device such as a ROM, that is, in a readable non-transitory tangible storage medium. The hardware processing may be implemented by a special purpose electronic circuit.

As shown in FIG. 4, the first computer 51 acquires a first encoder signal SGN_e1 from the first encoder 131, and acquires a first output shaft signal SGN_s1 from the first output shaft sensor 161. The first computer 51 generates a control signal for controlling the on/off operation of the switching elements 411 to 416 of the first motor driver 41, and outputs the control signal to the first motor driver 41. By controlling the on/off operation of the switching elements 411 to 416 based on the control signal, the energization of the first motor winding 11 is controlled.

The second computer 52 acquires a second encoder signal SGN_e2 from the second encoder 132, and acquires a second output axis signal SGN_s2 from the second output shaft sensor 162. The second computer 52 generates a control signal for controlling the on/off operation of the switching elements 421 to 426 of the second motor driver 42, and outputs the control signal to the second motor driver 42. By controlling the on/off operation of the switching elements 421 to 426 based on the control signal, the energization of the second motor winding 12 is controlled. Hereinafter, a combination of the first motor winding 11 and the first computer 51 and the like related to the energization control of the first motor winding 11 will be referred to as a first system. Further, a combination of the second motor winding 12 and the second computer 52 related to the energization control of the second motor winding 12 will be referred to as a second system. Hereinafter, as appropriate, a subscript "1" is added to the configuration and value related to the first system, and a subscript "2" is added to the configuration and value related to the second system.

The first computer 51 includes an angle calculation unit 511, a signal acquisition unit 512, a drive control unit 513, an abnormality determination unit 516, and the like. The angle calculation unit 511 counts pulse edges of each phase of the encoder signal SGN_e2 output from the encoder 131, and calculates an encoder count value $\theta$en2. The signal acquisition unit 512 acquires the output shaft signal SGN_s2 from the output shaft sensor 161.

The drive control unit 513 controls the drive of the motor 10 so that the detent roller 26 fits into the recesses 22 and 23 corresponding to the target shift range. When the encoder 131 is normal, the drive control unit 513 controls the drive of the motor 10 by feedback control so that the encoder count value $\theta$en1 becomes the target count value $\theta$cmd1 set according to the target shift range. Further, when the encoder 131 is abnormal, the drive control unit 513 can drive the motor 10 by open control for switching the energizing phase at predetermined time intervals without using the encoder count value $\theta$en1. The abnormality determination unit 516 determines whether the encoder 131 is abnormal.

The second computer 52 includes an angle calculation unit 521, a signal acquisition unit 522, a drive control unit 523, an abnormality determination unit 526, and the like. The angle calculation unit 521 counts pulse edges of each phase of an encoder signal SGN_e2 output from the encoder 132, and calculates an encoder count value $\theta$en2. The signal acquisition unit 522 acquires an output shaft signal SGN_s2 from the output shaft sensor 162.

The drive control unit 523 controls the drive of the motor 10 so that the detent roller 26 fits into the recesses 22 and 23 corresponding to the target shift range. When the encoder 132 is normal, the drive control unit 523 controls the drive of the motor 10 by feedback control so that the encoder count value θen2 becomes the target count value θcmd2 set according to the target shift range. Further, when the encoder 132 is abnormal, the drive control unit 523 can drive the motor 10 by open control for switching the energizing phase at predetermined time intervals without using the encoder count value θen2. The abnormality determination unit 526 determines whether the encoder 132 is abnormal.

The encoder count values θen1 and θen2 are values corresponding to the rotational positions of the motor 10. In the feedback control of the present embodiment, the drive of the motor 10 is controlled so that the encoder count values θen1 and θen2 as the motor angles become the target count values θcmd1 and θcmd2 as the target rotation positions. Since the control configurations of the first computer 51 and the second computer 52 are substantially the same, the details of the control will be described below focusing on the first computer 51. The value used for the calculation by the second computer 52 is appropriately read as that of the second system.

Even if an encoder abnormality occurs in one system, if the encoder in the other system is normal, the motor 10 can be driven by feedback control in the other system. For example, if the encoder abnormality occurs in the second system and no encoder abnormality occurs in the first system, the feedback control can be continued in the first system. Therefore, it is not necessary to perform open control in the second system. Further, if the feedback control is performed in the first system and the open control is performed in the second system, the feedback control of the first system may be hindered by the open control and the range switching may not be performed normally. Therefore, it is necessary for the computers 51 and 52 to shift to open control after grasping the abnormal state of the other system. However, when the computers 51 and 52 are completely independent and there is no exchange of information between the computers, or when the abnormality information cannot be shared due to a communication abnormality or the like, the computers 51 and 52 cannot acquire the abnormality information of another system.

Therefore, in the present embodiment, a delay is set up at the start of open control, and when an encoder abnormality occurs, it is determined whether the output shaft 15 to be controlled is being moved by another system. If the output shaft 15 is not moving, it is considered that the encoder abnormality has occurred in another system, and the open control is started.

Figure 5:
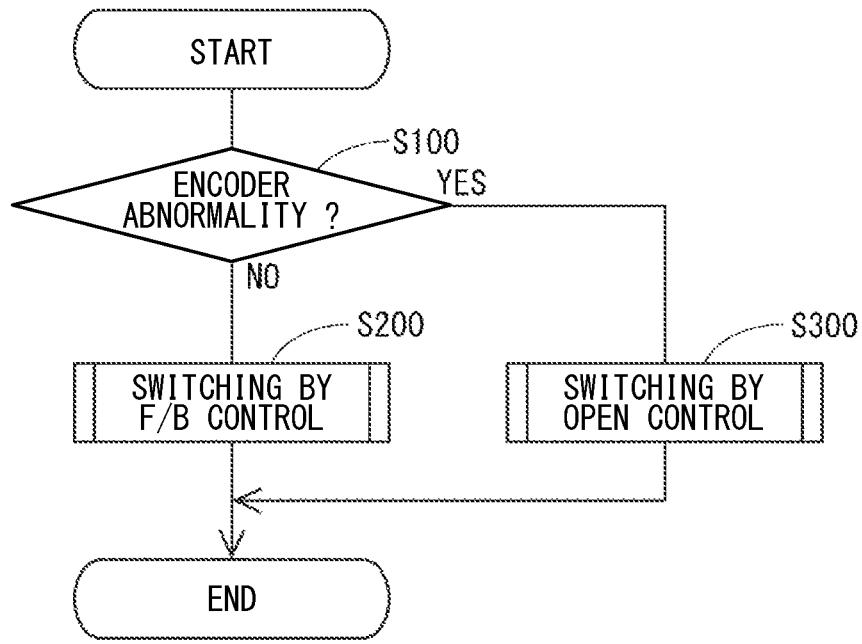
FIG. 5 is a flowchart illustrating a switching control selection process according to the first embodiment.

A selection process of a switching control in the present embodiment will be described with reference to the flowchart of FIG. 5. This process is executed by each of the computers 51 and 52 at a predetermined cycle (for example, 1 [ms]). Hereinafter, "step" in step S100 is omitted, and is simply referred to as a symbol "S." The same applies to the other steps. Here, the processing by the first computer 51 will be described.

In S100, the abnormality determination unit 516 determines whether or not the encoder abnormality in the own system has occurred. The encoder abnormality referred to here means a state in which a normal first encoder signal SGN_e1 cannot be acquired, including not only an abnormality of the encoder 131 itself but also a disconnection of wiring and the like. When it is determined that no encoder abnormality has occurred (S100: NO), the process proceeds to S200, and the range switching is performed by feedback control. When it is determined that the encoder abnormality has occurred (S100: YES), the process proceeds to S300, and the range switching is performed by open control. In the drawing, the feedback is described as "F/B".

Figure 6:
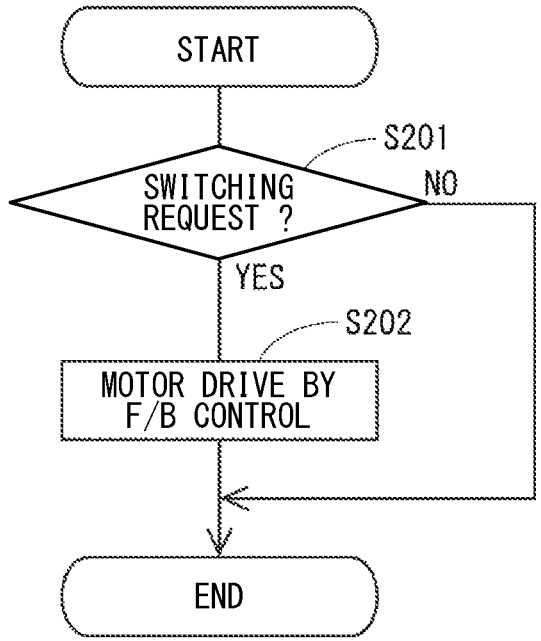
FIG. 6 is a flowchart illustrating range switching in feedback control according to the first embodiment.

Range switching by feedback control will be described with reference to the flowchart of FIG. 6. In S201, the drive control unit 513 determines whether or not there is a request for the shift range switching. If it is determined that there is no shift range switching request (S201: NO), the process of S202 is not performed and this routine is terminated. When it is determined that there is a shift range switching request (S201: YES), the process proceeds to S202, and the drive of the motor 10 is started by feedback control.

Figure 7:
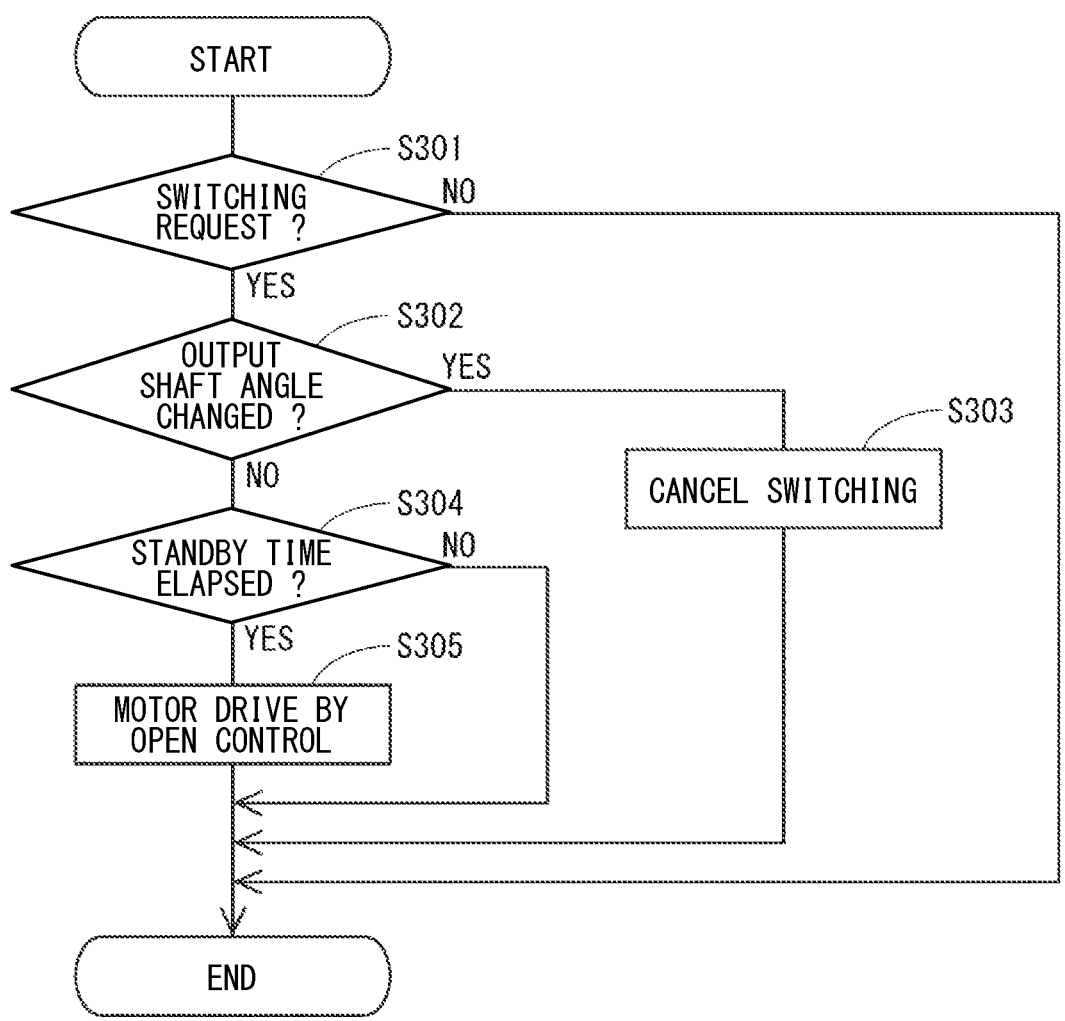
FIG. 7 is a flowchart illustrating range switching in open control according to the first embodiment.

Range switching by open control will be described with reference to the flowchart of FIG. 7. In S301, as in S201, the drive control unit 513 determines whether or not there is a request for the shift range switching. If it is determined that there is no shift range switching request (S301: NO), the process of S302 is not performed and this routine is terminated. When it is determined that there is the request of the shift range switching (S301: YES), the process proceeds to S302.

In S302, the rotation determination unit 517 determines whether or not the output shaft angle θs1 has changed based on the output shaft signal SGN_s1 acquired from the output shaft sensor 161. If it is determined that the output shaft angle θs1 has changed (S302: YES), the process proceeds to S303. In S303, since the motor 10 is driven by the second system, the drive control unit 513 does not shift to open control and cancels the range switching in its own system. When it is determined that the output shaft angle θs1 has not changed (S302: YES), the process proceeds to S304.

In S304, the drive control unit 513 determines whether or not a standby time Tw has elapsed. If it is determined that the standby time Tw has not elapsed (S304: NO), the process of S305 is not performed and this routine is terminated. When it is determined that the standby time Tw has not elapsed (S304: YES), the process proceeds to S305, and the motor 10 is started to be driven by open control.

Figure 8:
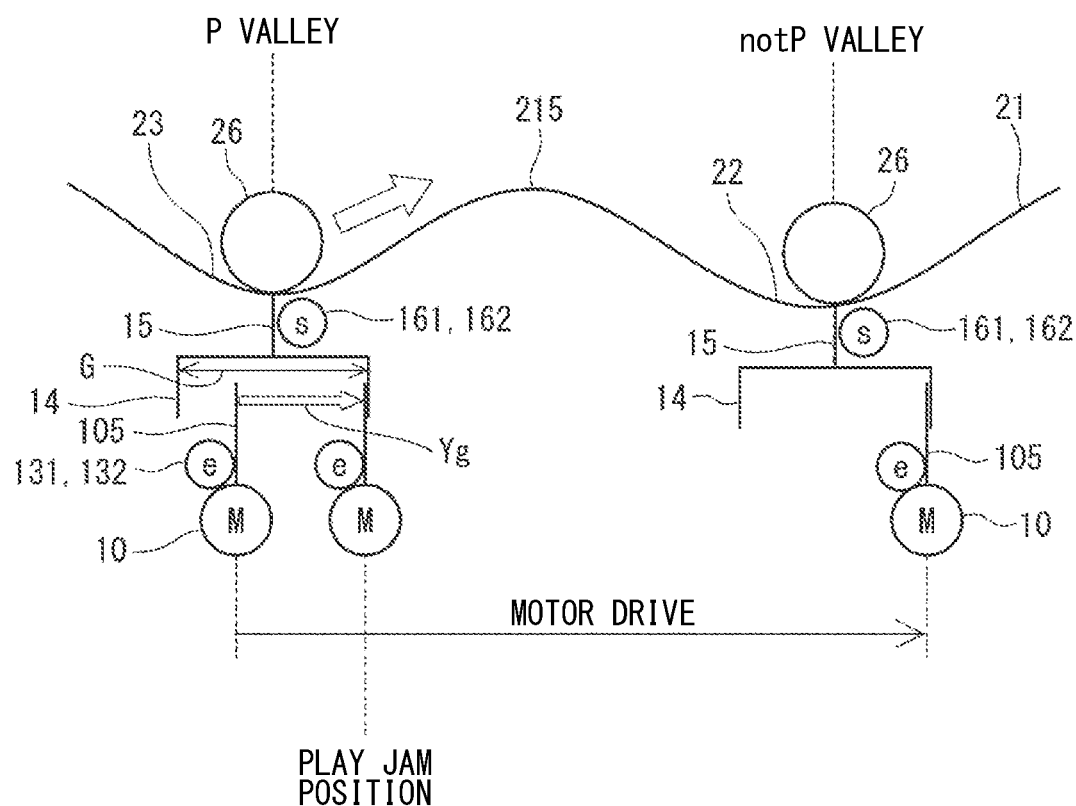
FIG. 8 is a schematic diagram illustrating play according to the first embodiment.

Here, the standby time Tw will be described with reference to FIG. 8. FIG. 8 schematically shows a concept of "play", in which the output shaft 15 and the speed reducer 14 are integrated, and the motor shaft 105 is movable within the range of play of the speed reducer 14. The motor shaft 105 and the speed reducer 14 may be integrated with each other so that "play" may exist between the speed reducer 14 and the output shaft 15. In this example, the "play" between the motor shaft 105 and the output shaft 15 will be mainly described as existing between the gear of the speed reducer 14 and the motor shaft 105. However, the "play" can be regarded as a sum total of play or backlash which is present between the motor shaft 105 and the output shaft 15. Hereinafter, the total amount of play and play between the motor shaft 105 and the output shaft 15 is referred to as "play G".

Here, a case where the shift range is switched from the P range to the notP range will be described as an example. FIG. 8 schematically shows how the detent roller 26 moves from the recess 23 to the recess 22 as the motor 10 rotates. In FIG. 8, the rotation directions of the motor 10 and the output shaft 15 will be described as the left-right direction in the drawing. Actually, the detent roller 26 moves between the recesses 22 and 23 by rotating the detent plate 21 integrally with the output shaft 15. However, in FIG. 8, the detent roller 26 is illustrated assumedly as moving together with the output shaft 15 for explanation.

As shown in FIG. 8, the speed reducer 14 is provided between the motor shaft 105 and the output shaft 15, and there is play including gear backlash between the motor shaft 105 and the output shaft 15. For example, when the motor 10 is a DC brushless motor, when the energization of the motor 10 is stopped, the motor shaft 105 rotates within the range of play due to the influence of the cogging torque, and the motor shaft 105 and the speed reducer 14 tend to be separated.

Further, as shown by the arrow Yg, when the motor 10 rotates in a state where the motor shaft 105 and the speed reducer 14 are separated from each other, the motor 10 is in an idle state and the output shaft 15 does not rotate, until the motor shaft 105 and the speed reducer 14 come into contact with each other. Therefore, even if the motor 10 is driven, the output shaft 15 does not rotate and the detected values of the output shaft sensors 161 and 162 do not change while the motor shaft 105 runs idle in the backlash G. Therefore, in the present embodiment, in order to prevent erroneous determination of the state on the other system side, the standby time Tw is set to be equal to or greater than the backlash idle time Tg, which is the time required for the motor shaft 105 to idle from one end side to the other end side of the backlash G. Hereinafter, the position where the motor shaft 105 and the speed reducer 14 come into contact with each other on the traveling direction side is referred to as a "play jam position".

Figure 9:
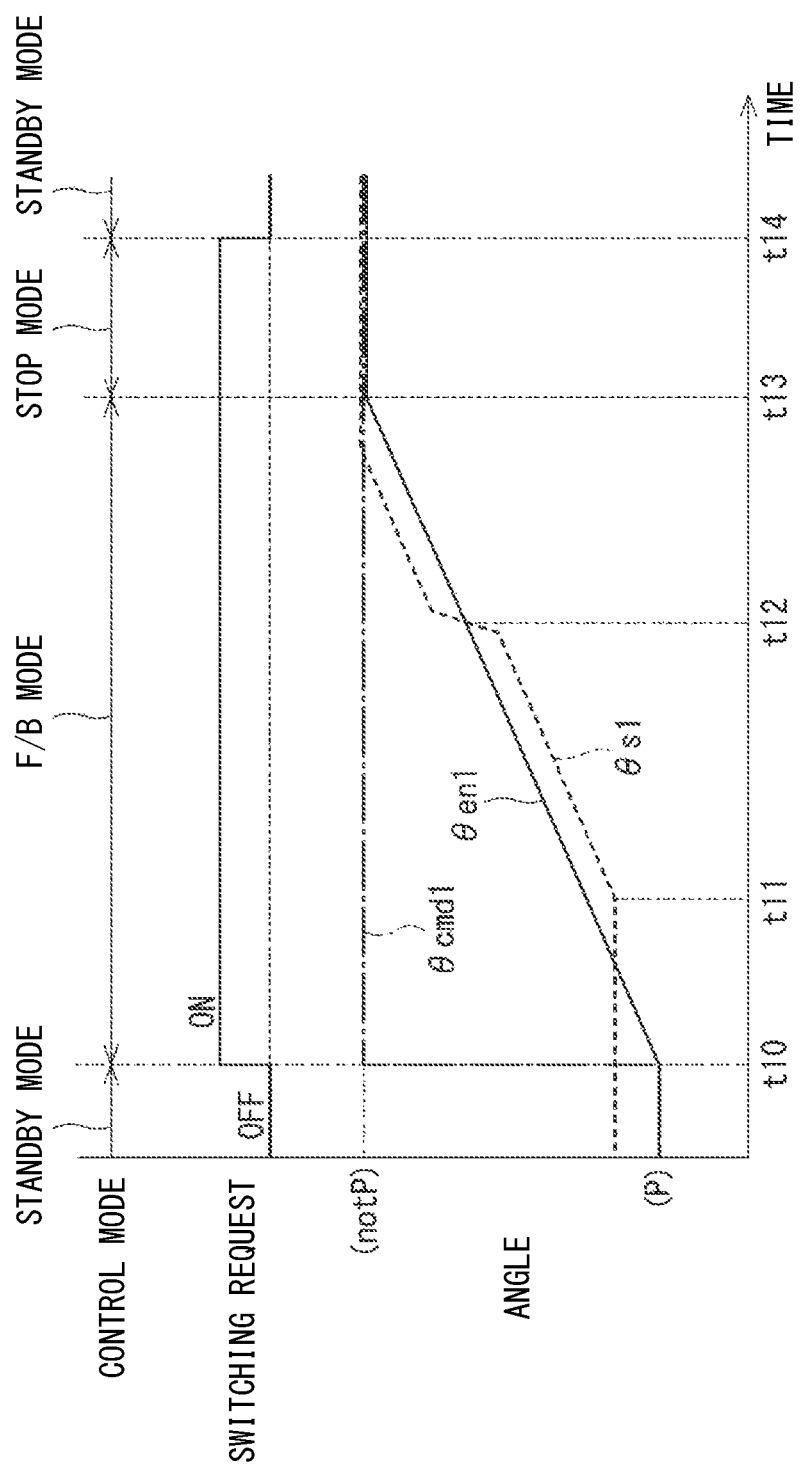
FIG. 9 is a time chart illustrating motor drive control when both systems are normal in the first embodiment.
Figure 10:
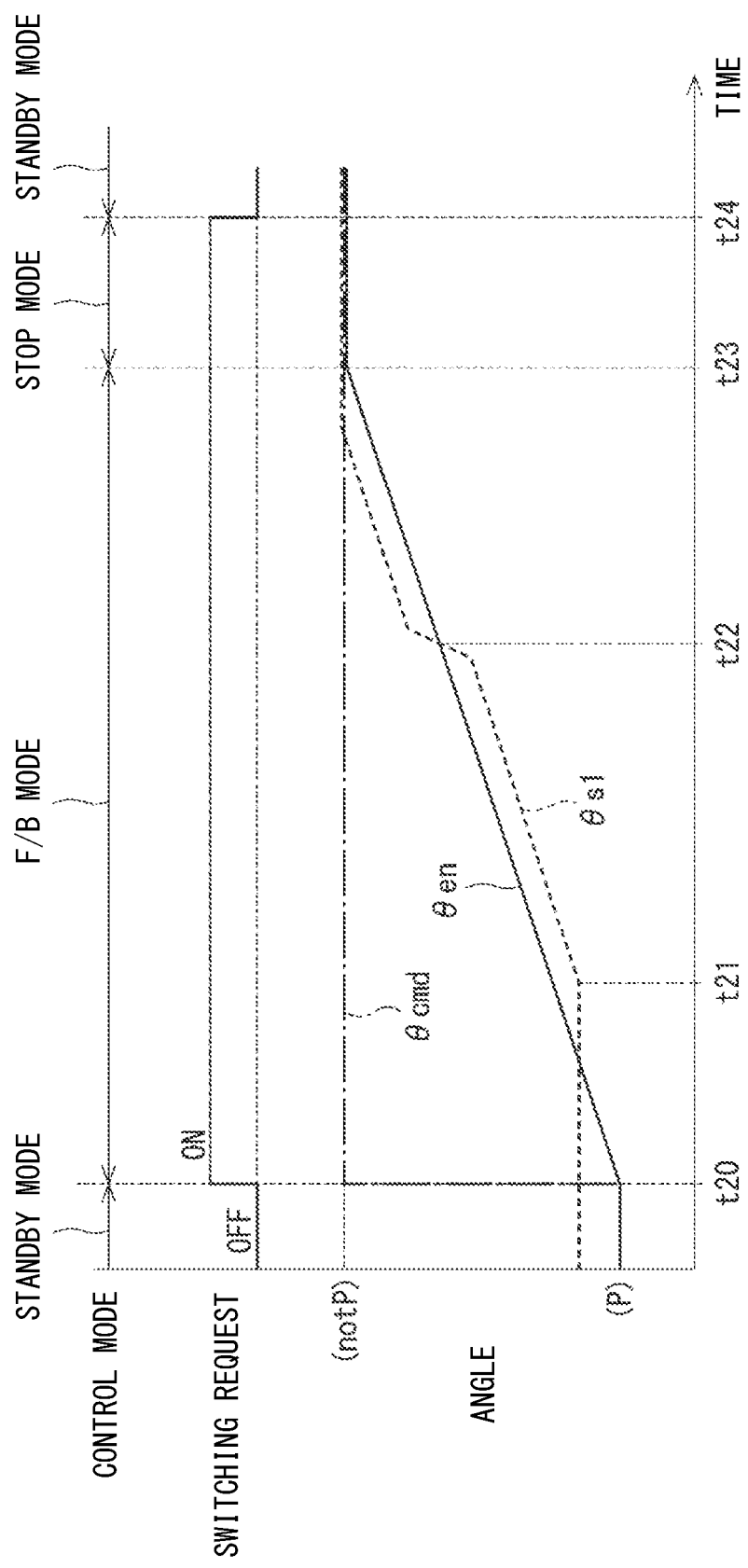
FIG. 10 is a time chart illustrating motor drive control when an encoder abnormality occurs in one system in the first embodiment.
Figure 11:
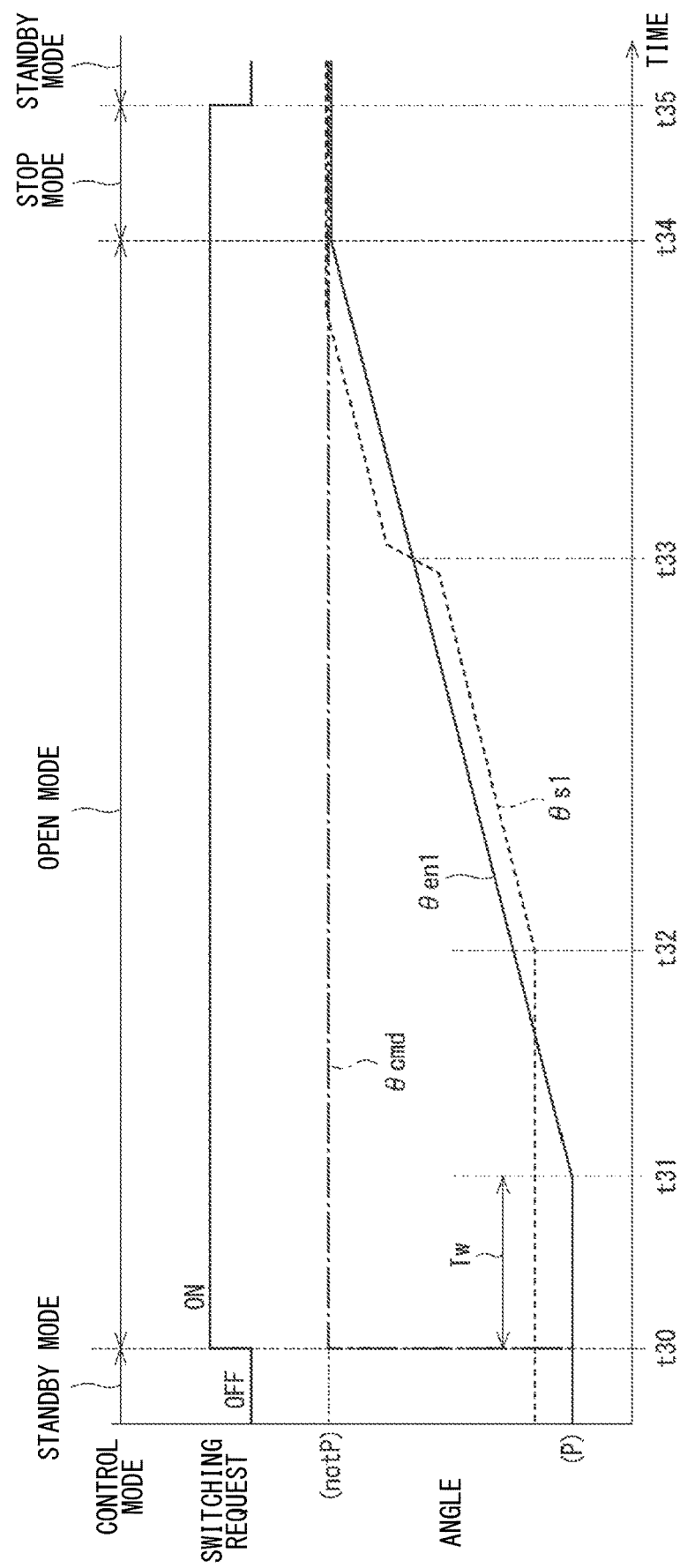
FIG. 11 is a time chart illustrating motor drive control when an encoder abnormality of both systems occurs in the first embodiment.

The motor drive control of the present embodiment will be described based on the time charts of FIGS. 9 to 11. In FIGS. 9 to 11, a common time axis is set as a horizontal axis, and a control mode, a shift range switching request, and an angle are shown on a vertical axis from the top. As for the angles, the encoder count value θen1 is indicated by a solid line, the target count value θcmd1 is indicated by a chain line, and the output axis angle θs1 is indicated by a broken line. The encoder count value θen1 and the target count value θcmd1 are set to be gear ratio converted values so as to match the output shaft angle θs1. Further, the encoder count value corresponding to the P range is described as (P), and the angle corresponding to the notP range is described as (notP). The same applies to FIGS. 12 and 13.

FIG. 9 shows a case where both systems are normal. When the requested shift range is switched from the P range to the notP range at time t10, the switching request is switched from OFF to ON. In the computers 51 and 52, the control mode of the motor 10 is switched from the standby mode to the feedback (F/B) mode, and the target count value θcmd1 is set.

Even if the motor 10 is driven at time t10, the output shaft angle θs1 does not change because the output shaft 15 does not rotate until time t11, when the backlash jam position occurs. Further, the time required from the start of driving the motor 10 to the arrival at the backlash jam position is shorter than the standby time Tw.

When the motor 10 is driven to the backlash jam position at time t11, the motor shaft 105 and the output shaft 15 rotate together. The motor shaft 105 precedes the output shaft 15 until the time t12 when the detent roller 26 reaches an apex 215 (see FIG. 8) between the recesses 22 and 23 of the detent plate 21. Then, when the apex 215 is exceeded, the output shaft 15 precedes the motor shaft 105 by the spring force of the detent spring 25. At the time t13 when the encoder count value θen1 reaches the predetermined range including the target count value θcmd1, the control mode is switched to the stop mode and the stop control for stopping the motor 10 is performed. At the time t14 when the stop control is completed, the control mode is switched to the standby mode.

FIG. 10 shows a case where an encoder abnormality has occurred in one system and the other system is normal. Here, it is assumed that the first system is normal and the second system has an encoder abnormality.

When the request shift range is switched at time t20, the switching request is switched from OFF to ON as at time t10. In the first computer 51, the control mode of the motor 10 is switched from the standby mode to the feedback (F/B) mode, and the target count value θcmd1 is set. The control and the like from time t20 to time t24 are the same as those from time t10 to time t14, and the torque is lower than that during the feedback control performed by the two systems, so that it takes a longer time in the feedback mode than when the two systems are driven.

Even if the motor 10 is driven at time t20, the output shaft angle θs1 does not change because the output shaft 15 does not rotate until time t21, when the backlash jam position occurs. In this example, the motor 10 is driven by feedback control in one system, and the time required to reach the backlash jam position is longer than that in the case of driving in two systems, but the time is shorter than the standby time Tw. That is, assuming that the backlash idle time during the feedback control in two system is Tg_f2 and the backlash idle time during the feedback control in one system is Tg_f1, a relationship between the time Tg_f2, the time Tg_f1, and the standby time Tw is given by an equation (1).

$$Tg\_f2 < Tg\_f1 \leq Tw \quad (1)$$

Here, since the encoder abnormality has occurred in the second system, the second computer 52 switches from the standby mode to the open mode, but does not energize the second motor winding 12 operated by open control until the standby time Tw elapses. Further, since the feedback control by the first system is started, the output shaft 15 starts to move at the time t21, which is the timing before the standby time Tw elapses. Therefore, the second computer 52 does not perform the open control and cancels the switching. As a result, the motor 10 can be appropriately driven without disturbing the feedback control in the first system.

FIG. 11 shows a case where the encoder abnormality occurs in both systems. When the request shift range is switched at time t30, the switching request is switched from OFF to ON. In the computer 51, the control mode of the motor 10 is switched from the standby mode to the open mode, but the first motor winding 11 is not energized by the open control until the standby time Tw elapses.

In this example, since the encoder abnormality also occurs in the second system, the output shaft 15 is not driven even if the standby time Tw elapses. Therefore, at the time t32 when the standby time Tw has elapsed, the open control is started, the energizing phase is switched at predetermined time intervals, and the motor 10 is driven to the design value according to the target shift range. At time t33, the motor shaft 105 precedes until the detent roller 26 exceeds the apex 215 of the detent plate 21, and the output shaft 15 precedes until the detent roller 26 exceeds the apex 215. At time t34, after rotating the motor 10 to the design value, stop control is performed in the stop mode, and the control mode is switched to the standby mode at time t35 when the stop control is completed.

Since the motor 10 is rotated more slowly during the open control than during the feedback control, during the open control it takes a longer time to switch the range than during the feedback control. Although the encoder count value θen1 and the target count value θcmd1 are shown in FIG. 11 for explanation, the encoder count value θen1 is not actually detected when the encoder abnormality occurs. The same applies to the encoder count value θen2 and the target count value θcmd2s of FIGS. 12 and 13, which will be described later.

As described above, the shift range control device 40 of the present embodiment switches the shift range by controlling the drive of the motor 10 in the shift-by-wire system 1 including the motor 10 and the output shaft 15. The motor 10 has a plurality of sets of motor windings 11 and 12, and the motor shaft 105 rotates by energizing the motor windings 11 and 12. The rotation of the motor shaft 105 is transmitted to the output shaft 15. The shift range control device 40 includes a plurality of computers 51 and 52 provided for each of the motor windings 11 and 12. Since the computers 51 and 52 have the same configuration, the first computer 51 will be referred to below.

The computer 51 includes the angle calculation unit 511, the signal acquisition unit 512, the drive control unit 513, and the abnormality determination unit 516. The angle calculation unit 511 acquires the encoder signal SGN_e1 from the encoder 131 that detects the rotational position of the motor. The signal acquisition unit 512 acquires the output shaft signal SGN_s1 from the output shaft sensor 161 that detects the rotational position of the output shaft 15. The drive control unit 513 controls the energization of the motor winding 11. The abnormality determination unit 516 determines whether the encoder 131 is abnormal.

Here, the combination of the motor windings 11 and 12 and the corresponding computers 51 and 52 is regarded as a system. Specifically, the combination of the first motor winding 11 and the corresponding first computer 51 is regarded as the first system, and the combination of the second motor winding 12 and the corresponding second computer 52 is regarded as the second system.

When the encoder 131 is normal, the drive control unit 513 controls the energization of the motor winding 11 of its own system by using the encoder signal SGN_e1. When the abnormality has occurred in the encoder 131 and it is determined that the output shaft 15 is rotating before the standby time Tw elapses (S302: YES in FIG. 7), the drive control unit 513 does not energize the motor winding 11 of the own system. That is, if the output shaft 15 is rotating before the standby time Tw elapses, it is determined that the feedback control in the other system is being performed, and the open control in the own system is canceled.

Further, when the abnormality has occurred in the encoder 131 and it is determined that the output shaft 15 has not rotated even after the standby time Tw has elapsed (S302: NO and S304: YES), the energization of the motor winding 11 in the own system is controlled without using the encoder signal SGN_e1.

In the present embodiment, when the encoder abnormality occurs, after the standby time Tw elapses, the motor 10 is started to be driven by open control, which is a control that does not use the encoder count values θen1 and θen2. Therefore, even if the abnormality occurs in the encoders 131 and 132, the motor 10 can be driven and the shift range can be switched. Further, even when the information related to the encoder abnormality cannot be shared between the computers 51 and 52, by providing the standby time Tw, it is considered that feedback control is being performed in the other system, if the output shaft 15 to be controlled is rotated before the standby time Tw elapses. Therefore, the shifting to open control can be appropriately canceled. In other words, in a state where the feedback control is possible in the other system, it is possible to prevent obstruction of feedback control in the other system by shifting to open control.

A play is formed between the motor shaft 105 and the output shaft 15. The standby time Tw is set to be equal to or greater than the backlash idle time Tg, which is the time required from the start of driving the motor 10 to the start of driving the output shaft 15. It is possible to prevent the backlash idle state from being erroneously determined as the encoder abnormality.

In the present embodiment, the shift-by-wire system 1 corresponds to the "shift range switching system", the computers 51 and 52 correspond to the "control units", the angle calculation units 511 and 521 correspond to the "motor rotation angle signal acquisition units", the signal acquisition units 512 and 522 correspond to the "output shaft signal acquisition units", and the encoders 131 and 132 correspond to the "motor rotation angle sensors". Further, the encoder signals SGN_e1 and SGN_e2 correspond to the "motor rotation angle signal" and the backlash idle time corresponds to the "idle time".

Second Embodiment

Figure 12:
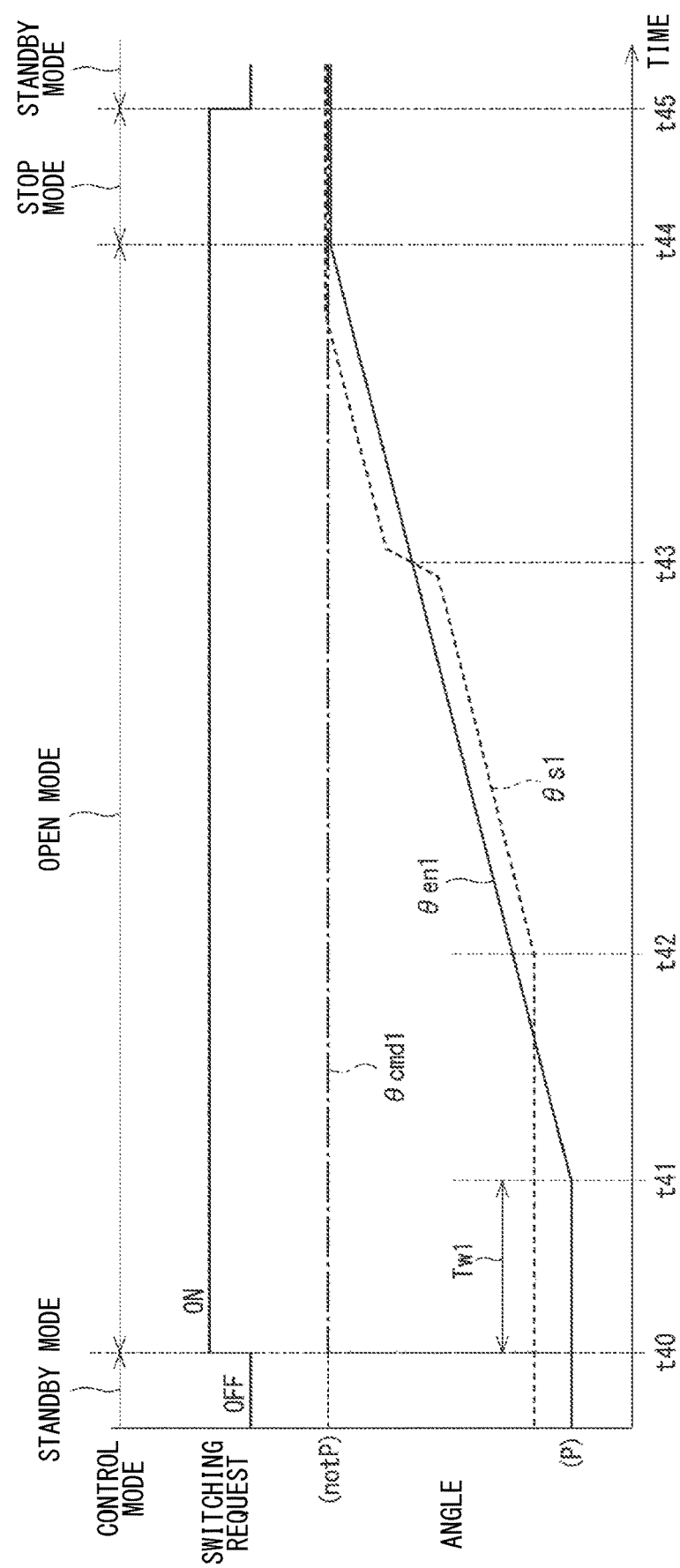
FIG. 12 is a time chart illustrating the motor drive control of the first system when the encoder is abnormal in a second embodiment.
Figure 13:
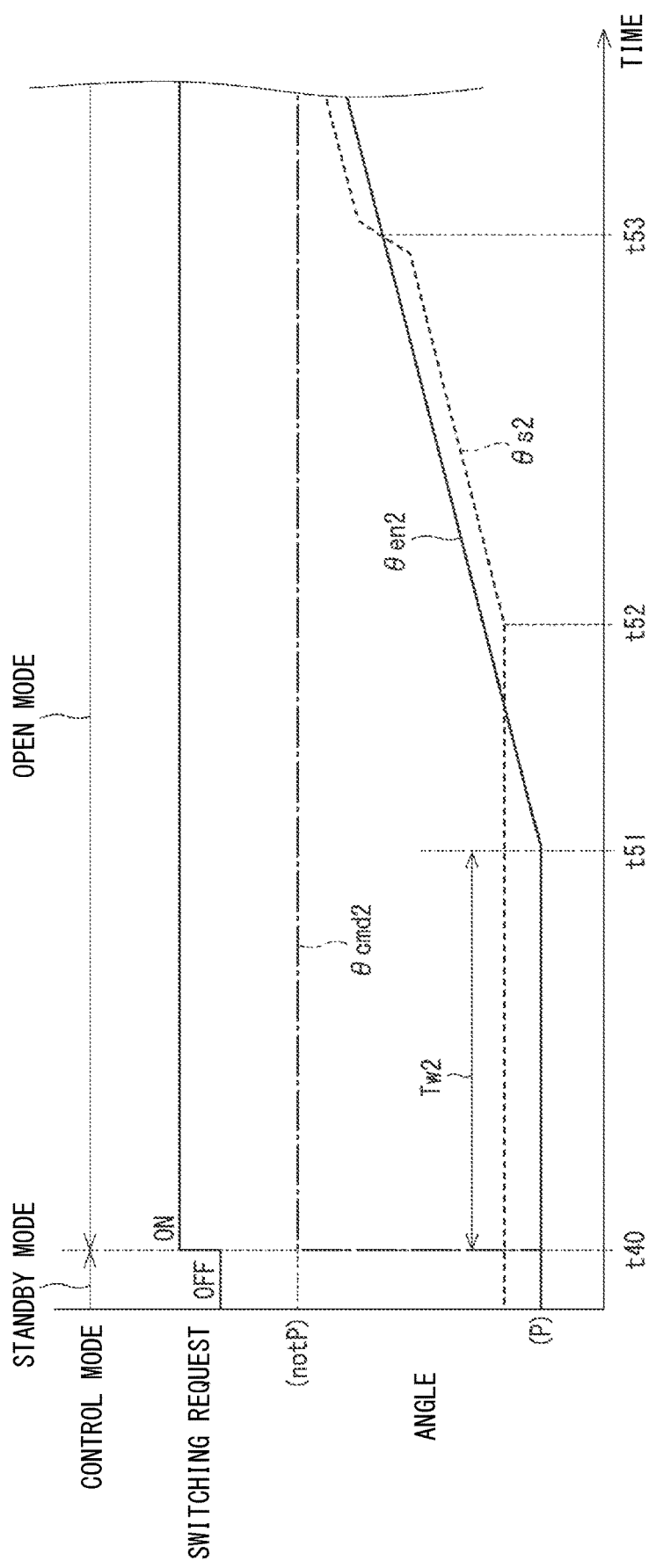
FIG. 13 is a time chart illustrating the motor drive control of the second system when the encoder is abnormal in the second embodiment.

A second embodiment is shown in FIGS. 12 and 13. As described in the first embodiment, when the encoder abnormality occurs in both systems, the control shifts to open control after the standby time Tw has elapsed. Here, for example, if the timing of recognizing the range switching request deviates between the first computer 51 and the second computer 52, there is a risk that the timing to start open control will be different between the systems.

Therefore, in the present embodiment, the first standby time in the first computer 51 is Tw1, the second standby time in the second computer 52 is Tw2, and the waiting time until the start of open control is different between the first computer 51 and the second computer 52. That is, the first computer 51 uses the first standby time Tw1 for the determination in S304, and the second computer 52 uses the second standby time Tw2 for the determination in S304. In the present embodiment, a relationship Tw1<Tw2 will be described here.

The first standby time Tw1 is set to the backlash idle time Tg_f1 or more in the feedback control in one system, similarly to the standby time Tw of the first embodiment. The second standby time Tw2 is set according to the first standby time Tw1 and the backlash idle time Tg_o1 due to open control in one system. The standby times Tw1 and Tw2 are shown in the equations (2) and (3).

$$Tw1 \geq Tg\_f1 \quad (2)$$

$$Tw2 \geq Tw1 + Tg\_o1 \quad (3)$$

As shown in FIG. 12, when the encoder abnormality occurs in the second system and when the encoder abnormality occurs in both systems, the required shift range is switched at time t40 and the control mode of the motor 10 is switched to open mode. The first computer 51 does not energize the first motor winding 11 by open control until the first standby time Tw1 elapses. Further, since the output shaft 15 is not driven even after the first standby time Tw1 has elapsed, the motor 10 is started to be driven by the open control by the first system at the time t42 when the first standby time Tw1 has elapsed. Here, since the relationship Tw1<Tw2 is set, the second computer 52 cancels the range switching in its own system (S303 in FIG. 7) and does not perform open control.

As shown in FIG. 13, when the encoder abnormality occurs in both systems and the drive by open control in the first system cannot be performed, the output shaft 15 is not driven even after the standby time Tw2 elapses, so that the drive of the motor 10 is started by the open control by the second system at the time t51 when the standby time Tw2 has elapsed. The control and the like after the time t41 and after the time t51 are both open drives in one system, and are the same as the control and the like after the time t31 in FIG. 11.

In contrast to feedback control in which the energization phase is switched by using the encoder count values θen1 and θen2 as triggers, in open control, it is difficult to synchronize the energization switching timing between the systems. Therefore, for example, if the timing for recognizing the range switching request is shifted for each system and the timing for starting the open control is shifted, the motor 10 cannot be driven appropriately. Therefore, there is a risk that the switching of the shift range will fail.

Therefore, in the present embodiment, when the encoder abnormality occurs, one system is preferentially used, and if open control is possible in the preferentially used system, open control in the other system is not performed. That is, at the time of open control, the motor 10 is driven by one system. As a result, inconsistency due to a shift in the start timing of open control can be prevented, and the shift range can be appropriately switched.

In the present embodiment, the standby times Tw1 and Tw2 are set to different values for each of the computers 51 and 52. Specifically, the standby time Tw2 in the second computer 52 is set to be equal to or longer than the time obtained by adding the backlash idle time Tg_o1 to the standby time Tw1 in the first computer 51. As a result, when the encoder abnormality occurs, open control is performed in one system, and inconsistency due to the shift in control timing between systems does not occur. Therefore, the shift range can be appropriately switched even when the encoder abnormality occurs. In addition, the same effects as those of the embodiments described above can be obtained.

In the present embodiment, the first computer 51 corresponds to the "first control unit", and the second computer 52 corresponds to the "second control unit". When there are three or more control units, for example, a third computer (not shown) is regarded as the "second control unit", and the second computer 52 is regarded as the "first control unit" with respect to the third computer. The standby time of the third computer is set to be equal to or longer than the time obtained by adding the backlash idle time Tg_o1 to the standby time Tw2 of the second computer 52. It is preferable that the standby time is set to increase by the backlash idle time Tg_o1 for each control unit.

Third Embodiment

Figure 14:
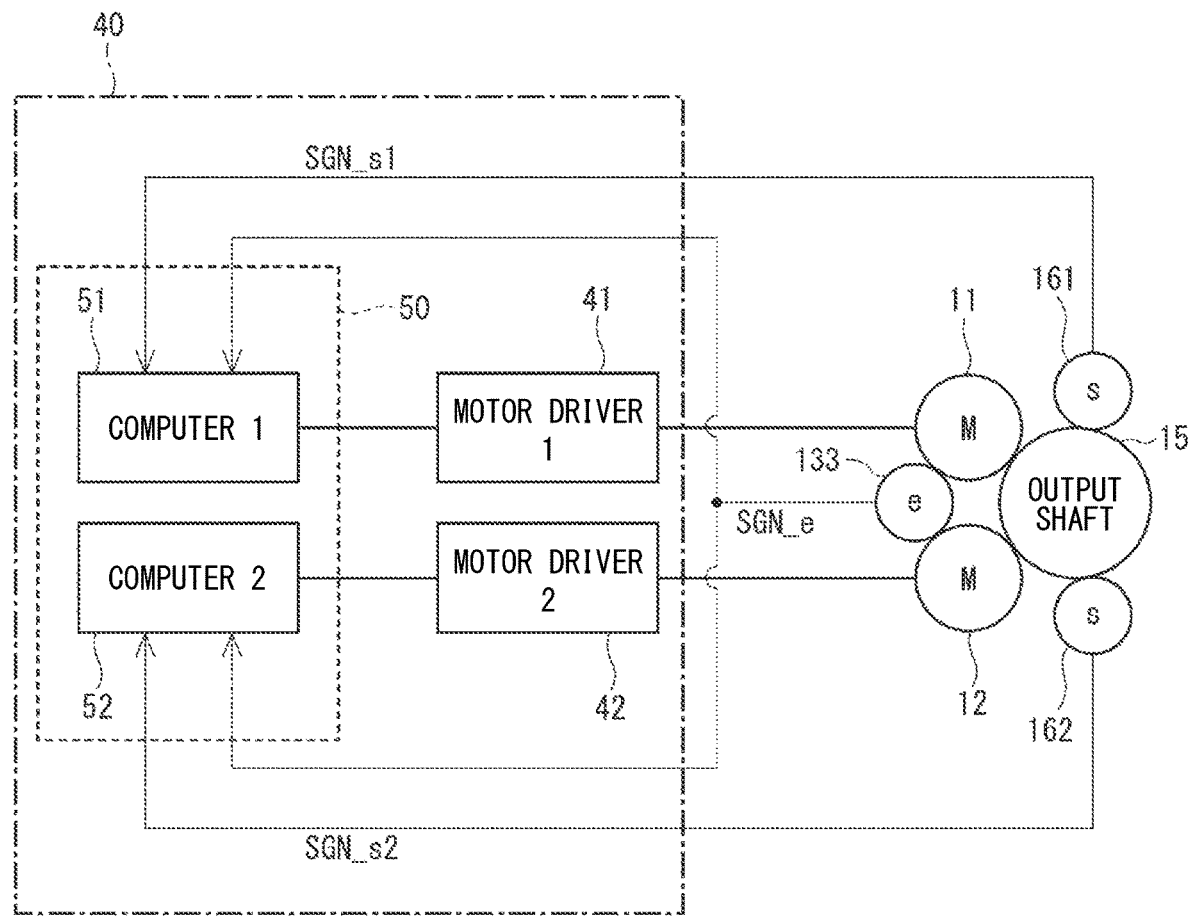
FIG. 14 is a block diagram showing a shift range control device according to a third embodiment.

A third embodiment is shown in FIG. 14. As shown in FIG. 14, in the present embodiment, one encoder 133 is provided, and the encoder signal SGN_e from the encoder 133 is commonly input to the first computer 51 and the second computer 52. In this case, if the abnormality occurs in the encoder 133, in the first system and the second system the encoders will be in a failed state at the same time, so that it is not necessary to wait for the feedback drive of the other system. Therefore, in the present embodiment, the first standby time Tw1 is set to 0. Further, the second standby time Tw2 is set by the equation (3).

In the present embodiment, the encoder 133 is shared by a plurality of computers 51 and 52, and the standby time Tw1 of the first computer 51, which is one control unit, is set to 0. As a result, when the encoder is abnormal, the time until the range switching is started can be shortened. In addition, the same effects as those of the embodiments described above can be obtained.

Other Embodiments

In the above embodiments, the motor is a DC brushless motor. In another embodiment, the motor may be other than a DC brushless motor. In the above embodiment, the motor driver as the drive circuit is a three-phase inverter. In other embodiments, the drive circuit may be configured by being capable of switching the energization of the motor windings. In the above embodiment, two motor drive control systems are provided. In another embodiment, three or more motor drive control systems may be provided.

In the above embodiments, the motor rotation angle sensor is a three-phase encoder. In another embodiment, the motor rotational angle sensor may be a two-phase encoder, or is not limited to the encoder, and any other devices such as a resolver may be used. In the present embodiment, the potentiometer was illustrated as an output shaft sensor. In another embodiment, the output shaft sensor may be any as long as it can detect the rotation of the output shaft.

In the embodiment described above, the detent plate is provided with two recess portions. In another embodiment, the number of recesses is not limited to two, and for example, a recess may be provided for each range. The shift range switching mechanism and the parking lock mechanism or the like may be different from those in the embodiments described above.

In the above embodiments, the decelerator is placed between the motor shaft and the output shaft. Although the details of the decelerator are not described in the embodiments described above, it may be configured by using, for example, a cycloid gear, a planetary gear, a spur gear that transmits torque from a reduction mechanism substantially coaxial with the motor shaft to a drive shaft, or any combination of these gears. As another embodiment, the speed reducer between the motor shaft and the output shaft may be omitted, or a mechanism other than the speed reducer may be provided. The present disclosure is not limited to the embodiment described above but various modifications may be made within the scope of the present disclosure.

The control circuit and method described in the present disclosure may be implemented by a special purpose computer which is configured with a memory and a processor programmed to execute one or more particular functions embodied in computer programs of the memory. Alternatively, the control circuit described in the present disclosure and the method thereof may be realized by a dedicated computer configured as a processor with one or more dedicated hardware logic circuits. Alternatively, the control circuit and method described in the present disclosure may be realized by one or more dedicated computer, which is configured as a combination of a processor and a memory, which are programmed to perform one or more functions, and a processor which is configured with one or more hardware logic circuits. The computer programs may be stored, as instructions to be executed by a computer, in a tangible non-transitory computer-readable medium.

The present disclosure has been described in accordance with embodiments. However, the present disclosure is not limited to this embodiment and structure. This disclosure also encompasses various modifications and variations within the scope of equivalents. Furthermore, various combination and formation, and other combination and formation including one, more than one or less than one element may be made in the present disclosure.

What is claimed is:

1. A shift range control device for switching a shift range by controlling a drive of a motor in a shift range switching system that includes the motor having a plurality of sets of motor windings and a motor shaft configured to rotate by energizing the motor windings and an output shaft to which the rotation of the motor shaft comprising:
- a plurality of motor driver configured to switch the energization of the motor winding for each motor winding; and
- a plurality of control units provided for each motor winding, wherein
- each of the control units includes
  - a motor rotation angle signal acquisition unit configured to acquire a motor rotation angle signal from a motor rotation angle sensor that detects a rotation position of the motor,
  - an output shaft signal acquisition unit configured to acquire an output shaft signal from output shaft sensors that detect a rotation position of the output shaft,
  - a drive control unit configured to control the energization of the motor winding, and
  - an abnormality determination unit configured to determine an abnormality of the motor rotation angle sensor,
- a combination of the motor winding and the control unit corresponding to the motor winding is referred to as a system,
- the drive control unit
  - when the motor rotation angle sensor is normal, controls the energization of the motor winding of its own system by using the motor rotation angle signal through the motor driver,
  - when the motor rotation angle sensor has an abnormality and it is determined that the output shaft is rotating before a standby time elapses, does not energize the motor winding of the own system, and
  - when it is determined that the output shaft is not rotating even after the standby time has elapsed, controls the energization of the motor winding of its own system without using the motor rotation angle signal through the motor driver.

2. The shift range control device according to claim 1, wherein
- a play is formed between the motor shaft and the output shaft, and
- the standby time is set to be equal to or greater than an idle time, which is the time required from a start of driving the motor to a start of driving the output shaft.

3. The shift range control device according to claim 2, wherein
- the standby time is set to a different value for each control unit.

4. The shift range control device according to claim 3, wherein
- the standby time in a second control unit is set to be equal to or longer than a time obtained by adding the idle time to the standby time in a first control unit.

5. The shift range control device according to claim 4, wherein
- when the motor rotation angle sensor is shared by a plurality of the control units, the standby time of one control unit is set to 0.

* * * * *